May 2, 1961 W. GREGG 2,982,563
SECONDARY TRAILER ASSEMBLY
Filed July 2, 1958 2 Sheets-Sheet 1

INVENTOR.
WILLIAM GREGG
BY Woodling & Krost
ATTORNEYS

May 2, 1961  W. GREGG  2,982,563
SECONDARY TRAILER ASSEMBLY
Filed July 2, 1958  2 Sheets-Sheet 2

INVENTOR.
WILLIAM GREGG
BY Woodling & Krost
ATTORNEYS

United States Patent Office 2,982,563
Patented May 2, 1961

2,982,563
SECONDARY TRAILER ASSEMBLY
William Gregg, Cleveland, Ohio, assignor to The W. H. Fay Company, a corporation of Ohio
Filed July 2, 1958, Ser. No. 746,141
7 Claims. (Cl. 280—81)

The invention relates in general to road vehicles and more particularly to a secondary or auxiliary trailer for use with a main or primary trailer.

The present invention has many applications and the following is only one of the specific physical embodiments which it may take. The present invention has been shown in configuration with a tractor-trailer unit commonly utilized in the motor transport field.

An object of the invention is to provide a secondary or auxiliary trailer for connection to a main or primary trailer whereby a greater amount of material may be carried by the assembly.

Another object of the invention is to provide a secondary trailer for connection to a primary trailer with connection means which permit regulated turning movement between the two trailers when the unit is negotiating a turn and which will return the secondary trailer to down-the-road alignment once the motor vehicle trailer has negotiated the turn.

Another object of the invention is to provide a tractor-trailer unit with a means coacting between the secondary and primary trailer wherein the two may be positively secured together and will remain in alignment when it is desired to back the tractor-trailer unit into a desired position. This means, in the embodiment shown, may be rendered inactive when it is desired to run the unit forwardly over an extended distance.

Another object of the invention is to provide a tractor-trailer unit having a primary and secondary trailer with a load carrying structure wherein articles may be transported which are the combined length of the tractor-trailer unit. The load carrying structure is also provided with a plurality of load carrying surfaces at differing vertical and horizontal positions.

Another object of the invention is to provide a tractor-trailer unit with a secondary trailer wherein an overall length may be utilized which is in accord with present-day regulations.

Another object of the invention is to provide a tractor-trailer unit with a trailer having a bed surface which is recessed intermediate its side portions whereby rolls of material may be safely and conveniently carried.

Other objects and a fuller understanding of this invention may be had by referring to the following description and claims, taken in conjunction with the accompanying drawings, in which:

As mentioned hereinabove, the present invention may assume many physical forms, but the detailed description will be devoted to describing the invention in conjunction with a tractor-trailer unit commonly used in the transport field.

Figure 1:
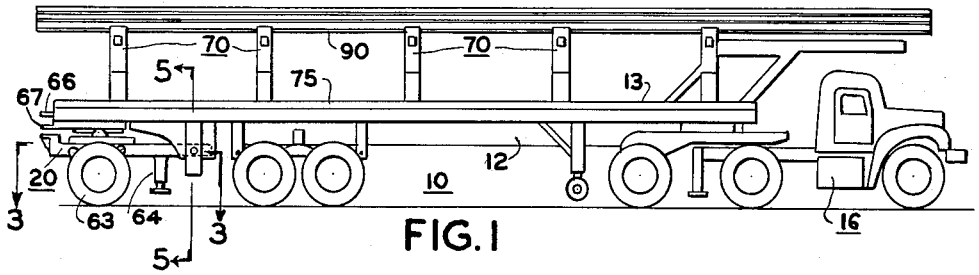
Figure 1 is a side elevational view of a road vehicle constructed in accordance with the teachings of the present invention.
Figure 2:
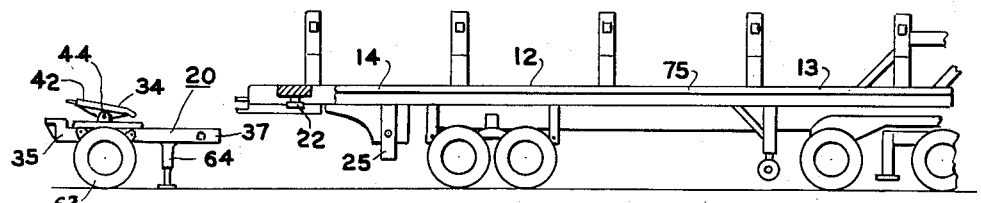
Figure 2 is a side elevational view of the left end of the road vehicle shown in Figure 1 and with the secondary trailer disconnected from the primary trailer.
Figure 5:
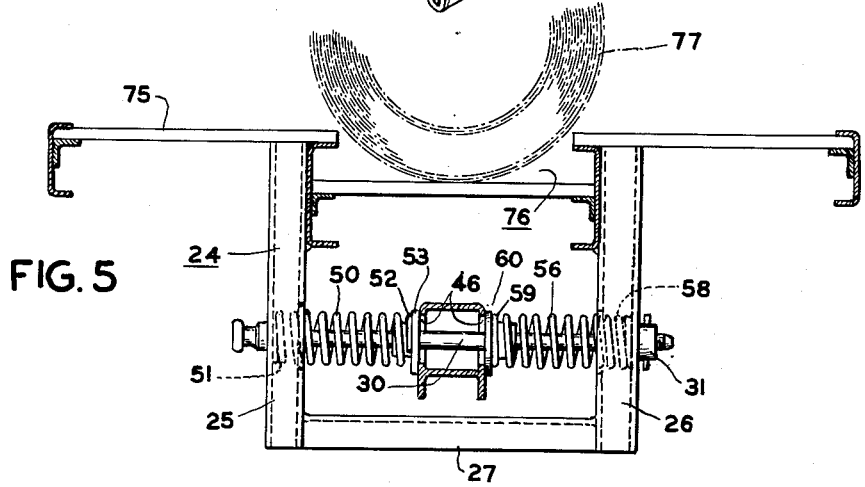
Figure 5 is an enlarged view taken generally along the line 5—5 of Figure 1.

Referring specifically to Figures 1 and 2, the embodiment shown is a tractor-trailer unit 10 which includes in combination a primary or main trailer 12 having front and rear end portions 13 and 14, respectively. A tractor 16 of conventional design is provided and connection means are utilized for connecting the tractor 16 to the front end portion 13 of the primary trailer 12. Figure 2 shows the secondary trailer 20 of the present invention disconnected from the primary trailer 12. It will be noted that the rear end portion of the primary trailer, in effect, overhangs the secondary trailer when the two are connected together. A king pin 22 is fixedly secured on the underside of the overhanging rear end portion of the primary trailer. This king pin extends vertically downwardly therefrom, as best seen in Figure 2. A framework 24 (Figures 3 and 5) is carried by the primary trailer between the king pin and the front end portion of the primary trailer. The framework 24 includes first and second spaced vertical beams 25 and 26, respectively, which are joined at their lower end portions by a transverse beam 27. These beams, as shown, are of a box shape in cross-section, however, it will be readily recognized that they may assume many physical forms. Each of the spaced vertical beams 25 and 26 is provided with an opening 28 and between the vertical beams 25 and 26 and through the openings 28 extends a guide rod 30 which is fixedly secured in this position by means of a nut 31 which is fastened to a threaded end of the rod.

Figure 3:
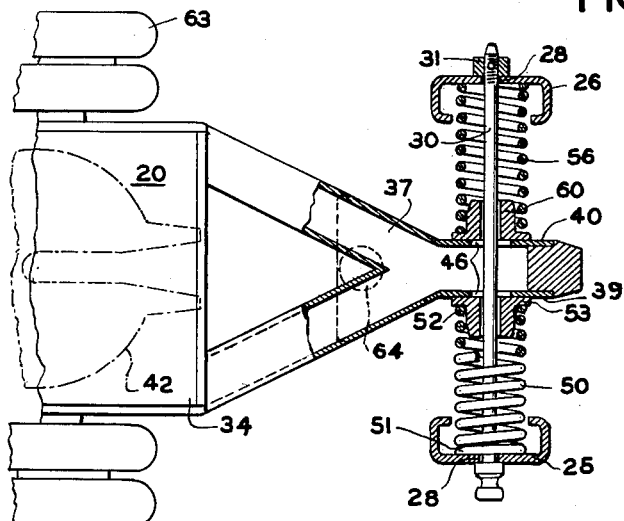
Figure 3 is an enlarged view taken generally along the line 3—3 of Figure 1.

The secondary trailer 20 has front and rear end portions 34 and 35, respectively. Integrally secured to the front end portion of the secondary trailer 20 is a tongue member 37 which is generally Y-shaped in plan configuration and the forward end portion of the tongue member includes first and second side walls 39 and 40, respectively. A fifth wheel 42 of conventional construction is secured to the secondary trailer and this fifth wheel is mounted for limited movement about an axis 44 which is generally transverse to the extent of the secondary trailer and of the extent of the entire tractor-trailer unit. Each of the first and second side walls 39 and 40 of the tongue member 37 is provided with openings 46 extending therethrough which are larger than the size of the rod 30. The king pin of the primary trailer and the fifth wheel of the secondary trailer connect the two trailers together, as shown in Figure 1, and in this position, the tongue member 37 of the secondary trailer 20 resides within the framework 24 between the vertical beams 25 and 26, as best seen in Figure 3. In this position, the rod 30 extends through the openings 46 in the first and second side walls 39 and 40, respectively, of the tongue member. Since the openings 46 are slightly larger than the rod 30, the tongue is permitted limited vertical movement relative to the framework 24. A first spring member 50 surrounds the rod 30 and at one end portion 51 is recessed within the first vertical beam 25, as best shown in Figure 3. The other end portion 52 of the spring member 50 bears against a first collar member 53 which in turn engages the first side wall of the tongue member. A second spring member 56 surrounds the rod 30 and at one end portion 58 is recessed within and engages the second vertical beam 26 of the framework. The other end portion 59 of the spring 56 engages a second collar member 60 which in turn engages the second side wall 40 of the tongue member. With this construction, it will be appreciated that the springs 50 and 56 exert a biasing force tending to maintain the tongue member in a position intermediate the beams 25 and 26.

The function which this construction accomplishes will now be described. Assume that the tractor-trailer unit is traveling in a straight line direction over a comparatively straight piece of road. In this travel the tongue will assume the position substantially as shown in Figure 3. Assume now that the tractor-trailer unit is about to negotiate a curve in a roadway. The primary trailer will follow the tractor as it goes into the turn, however, with a rigid connection between the primary and secondary trailers, the wheels 63 on the secondary trailer will tend to skid or scrape along the ground. The present invention provides a turning connection between the primary and secondary trailers to do away with this sort of happening. With the construction shown herein, if the tractor and primary trailer make a turn to the right, for example, then the secondary trailer will follow. Turning of the tractor and primary trailer to the right will cause the spring member 50 to be compressed between the first vertical beam 25 and the first collar member 53. As soon as the tractor-trailer unit has negotiated the curve and has entered upon another straight stretch of roadway, the spring 50 which has been compressed will serve to, in effect, return the tongue member to a position intermediate the beams 25 and 26. The springs 50 and 56 are of a value to maintain the tongue comparatively steady in straight down-the-road travel of the tractor-trailer unit. The same chain of results occurs when the tractor-trailer unit negotiates a curve to the left with the exception that the opposite spring 56 is compressed. The construction just described between the primary and secondary trailers in most instances is sufficient to permit a backing up of the tractor-trailer unit without losing control of the direction of travel of the secondary trailer. However, at times it is necessary to insure positively that the secondary trailer does not turn relative to the primary trailer when the unit is being backed into a predetermined position. To accomplish the end that there will be no turning between the primary and secondary trailers, a bracket 66 (Figure 4) is provided on the rear end wall of the primary trailer and another bracket 67 is provided at the same place on the secondary trailer. Each of these brackets has a vertical opening therethrough which openings are in alignment and through these openings in the brackets is insertable a pin 68 which serves to prevent turning movement between the trailers.

Figure 4:
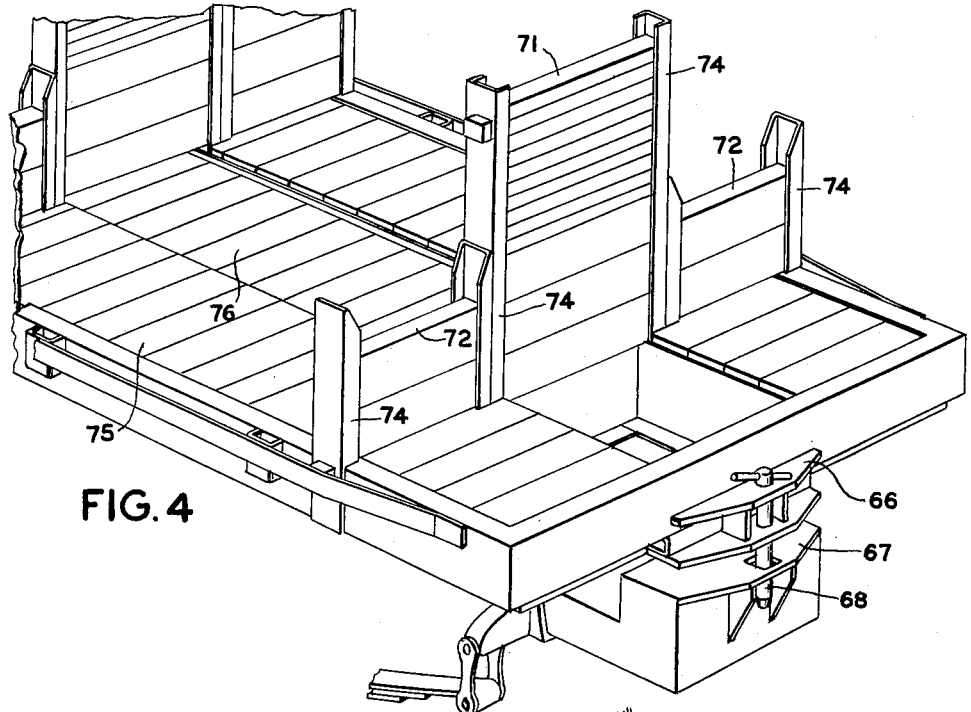
Figure 4 is a fragmentary isometric view of the rear end portions of the primary and secondary trailers.

The primary trailer is provided with a plurality of longitudinally spaced and vertically extending support structures 70 seen in Figures 1 and 2, and in more detail in Figure 4. Each of the load support structures 70 is provided with a first load supporting surface 71 and second load supporting surfaces 72 which are vertically spaced from the surface 71. In Figure 1, the first load supporting surfaces 71 are shown as supporting lengths of material 90, for example steel, which is of a length equal to the length of the entire tractor-trailer unit. Each of the load supporting surfaces in the hereindescribed embodiment includes the upper surface of one of a plurality of wooden plank members which are held in position by channel members 74. The primary trailer, between the load supporting structures 70, is provided with a bed surface 75 which has an intermediate portion 76 recessed so that material can be carried therein without the concern that the material will be disturbed and fall from the trailer. This recessed intermediate portion 76 is peculiarly adapted to hold rolls of material such as steel, as indicated by the dot-dash line 77 in Figure 5.

Figure 6:
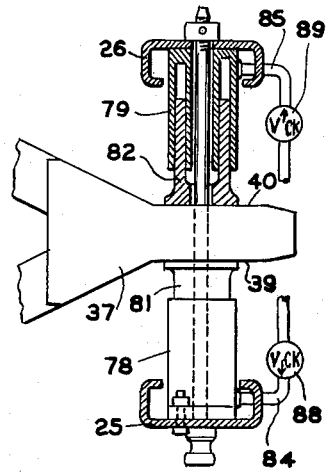
Figure 6 is a modification of the structure shown in Figures 3 and 5.

Figure 6 illustrates a modification of the structure shown in Figure 3. In this modification, the springs have been replaced by a cylinder and piston arrangement wherein a fluid may be compressed to provide the centering force for the tongue member. In this embodiment, first and second annular cylinders 78 and 79 are respectively secured to the vertical beams 25 and 26. Within each of the cylinders 78 and 79 resides an annular type of piston 81 and 82, respectively, which at one end portion, bear against opposite sides of the tongue member 37. First and second conduits 84 and 85 are provided to supply a fluid, for example air, under a predetermined pressure to each of the annular cylinders 78 and 79. Interposed in each of the branch conduits 84 and 85 are one-way check valves 88 and 89, respectively. These permit the cylinders to be replenished with air when desirable and prevent air from leaving the cylinders. Operation of the instant mechanism is esentially the same as the operation of the construction illustrated in Figure 3. For example, if the tractor-trailer unit should make a turn to the left to negotiate a curve, the tongue member would move to the right tending to move the piston 81 within cylinder 78 toward the vertical beam 25 thereby compressing the air within the chamber. When the tractor-trailer had negotiated the curve, the compressed air within cylinder 78 by way of piston 81 would tend to return the tongue member to its position intermediate its beams 25 and 26.

It will thus be seen from the foregoing detailed description that a construction has been provided for connecting a secondary trailer to a primary trailer which permits regulated turning movement between the two trailers when the unit is negotiating a turn and which will return the secondary trailer to down-the-road alignment once the turn has been negotiated. Means have also been provided for positively insuring that there will be no turning movement between the primary and secondary trailers when it is desired to back the same up. The construction which deals with this is the construction of the brackets 66 and 67 and pin member 68. The unit is also provided with load supporting structures which permit the transporting of materials which are of a length equal to the combined length of the tractor-trailer unit. The bed surface of the unit is also provided with a recessed portion permitting easy transportation of roll material without additional blocking which is usually required.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a tractor-trailer unit which has a primary trailer pulled by a tractor the combination of a king pin on the rear end portion of said primary trailer, a framework carried by said primary trailer between said king pin and the front end portion of said primary trailer, said framework including first and second spaced vertical beams joined at their lower end portions by a transverse beam, a guide rod member extending beween said first and second spaced vertical beams, a secondary trailer having front and rear end portions, said secondary trailer having a tongue member secured to said front end portion thereof, a fifth wheel on said secondary trailer, said tongue member having first and second side walls with an opening therethrough, said king pin of said primary trailer and said fifth wheel of said secondary trailer connecting said two trailers together, said guide rod member extending through said opening in said first and second side walls of said tongue member, a first spring member surrounding said guide rod member and extending between said first vertical beam and said first side wall of said tongue member, a second spring member surrounding said guide rod member and extending between said second vertical beam and said second side wall of said tongue member, and means which may be selectively extended between said primary and secondary trailers for preventing turning movement therebetween.

2. A transportation unit including in combination a primary trailer having a rear end portion, a kind pin on said rear end portion of said primary trailer, a framework carried by said primary trailer forwardly of said rear end portion of said primary trailer, said framework including first and second spaced members joined by a transverse beam, a guide member extending between said first and second spaced members, a secondary trailer, said secondary trailer having a tongue member, a fifth wheel on said secondary trailer, said tongue member having an opening therethrough, said king pin of said primary trailer and said fifth wheel of said secondary trailer connecting said two trailers together, said guide member extending through said opening in said tongue member, a first spring member surrounding said guide member and located between said first spaced member and one side of said tongue member, and a second spring member surrounding said guide member and located between said second spaced member and the other side of said tongue member.

3. A transportation unit including in combination a primary trailer having a rear end portion, a king pin on said rear end portion of said primary trailer, a framework carried by said primary trailer, said framework including first and second spaced members joined by a transverse beam, a guide member extending between said first and second spaced members, a secondary trailer, said secondary trailer having a tongue member, a fifth wheel on said secondary trailer, said tongue member having an opening therethrough, said king pin of said primary trailer and said fifth wheel of said secondary trailer connecting said two trailers together, said guide member extending through said opening in said tongue member, a first cylinder mounted on said first spaced member, a first piston in said first cylinder and operably engaging one side of said tongue member, a second cylinder mounted on said second spaced member, a second piston in said second cylinder operably engaging the other side of said tongue member, and means for supplying a fluid under pressure to said first and second cylinders.

4. A transportation unit including in combination a primary trailer having a rear end portion, first and second spaced members carried by said rear end portion of said primary trailer, a secondary trailer located behind said primary trailer and having wheels supported by a transverse axle, said secondary trailer having a tongue member, a king pin on one of said primary and secondary trailers, a fifth wheel on the other of said primary and secondary trailers, said king pin and said fifth wheel connecting said primary and said secondary trailers together about a generally vertical axis which is substantially normal to said transverse axle, first resilient means extending between said first spaced member and one side of said tongue member and second resilient means extending between said second spaced member and the other side of said tongue member.

5. In a road vehicle the combination of a primary and a secondary trailer, pivot means connecting said secondary trailer to said primary trailer, said secondary trailer having a tongue member and wheels supported by a transverse axle, said tongue member extending forwardly of said pivot means, said pivot means acting about a generally vertical axis which is substantially normal to said transverse axle, resilient means acting between said primary trailer and said tongue of said secondary trailer for permitting restricted turning between said primary and said secondary trailer about said pivot means.

6. A transportation unit designed to normally travel in a forwardly direction on the road including in combination a primary trailer having a rear end portion, a king pin on said rear end portion of said primary trailer, a framework carried by said rear end portion of said primary trailer, said framework including first and second spaced members which extend in a generally vertical direction, guide means between said first and second spaced members, a secondary trailer positioned behind said primary trailer, said secondary trailer having a tongue member extending forwardly toward said primary trailer and being positioned generally centrally between said first and second spaced members, a fifth wheel on said secondary trailer, said king pin of said primary trailer and said fifth wheel of said secondary trailer connecting said two trailers together, said guide means maintaining said tongue member at a substantially constant vertical position while permitting side to side movement thereof, first spring means located between said first spaced member and one side of said tongue member thereby urging said tongue member toward said central position, and second spring means located between said second spaced member and the other side of said tongue member and also thereby urging said tongue member toward said central position.

7. A transportation unit including in combination a primary trailer having a rear end portion, first and second members carried by said rear end portion of said primary trailer, a secondary trailer located behind said primary trailer, said secondary trailer having a tongue member, a king pin on one of said primary and secondary trailers, a fifth wheel on the other of said primary and secondary trailers, said king pin and said fifth wheel connecting said primary and said secondary trailers together, first resilient means extending between said first member and one side portion of said tongue member and second resilient means extending between said second member and the other side portion of said tongue member and guide means for guiding said tongue member through lateral movements while permitting limited vertical movement of said tongue member relative to said primary trailer.

References Cited in the file of this patent

UNITED STATES PATENTS

| | | |
|---|---|---|
| 2,385,099 | Nelson | Sept. 18, 1945 |
| 2,590,962 | Gurton et al. | Apr. 1, 1952 |
| 2,731,276 | Cross | Jan. 17, 1956 |
| 2,761,693 | Stover | Sept. 4, 1956 |
| 2,776,846 | Willock | Jan. 8, 1957 |
| 2,798,734 | Gregg | July 9, 1957 |

FOREIGN PATENTS

| | | |
|---|---|---|
| 9,930 | Great Britain | Feb. 4, 1915 |